(12) United States Patent
Rölleke

(10) Patent No.: US 7,870,818 B2
(45) Date of Patent: Jan. 18, 2011

(54) PISTON FOR A PISTON-CYLINDER UNIT

(75) Inventor: Hartmut Rölleke, Kircheib (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 385 days.

(21) Appl. No.: 12/072,034

(22) Filed: Feb. 22, 2008

(65) Prior Publication Data

US 2008/0202329 A1 Aug. 28, 2008

(30) Foreign Application Priority Data

Feb. 23, 2007 (DE) .................. 10 2007 009 011

(51) Int. Cl.
*F16J 1/00* (2006.01)
*F16F 9/36* (2006.01)

(52) U.S. Cl. .................. 92/181 R; 188/322.15

(58) Field of Classification Search ............. 92/181 R, 92/183, 181 P; 188/322.15, 322.17, 322.22
See application file for complete search history.

(56) References Cited

U.S. PATENT DOCUMENTS

| | | | | |
|---|---|---|---|---|
| 2,953,223 A * | 9/1960 | Dillenburger et al. | ..... | 92/181 R |
| 3,093,891 A * | 6/1963 | Karlgaard | .............. | 29/888.044 |
| 4,635,909 A * | 1/1987 | Gold | ..................... | 188/322.15 |
| 6,817,454 B2 * | 11/2004 | Nezu et al. | ............. | 188/322.15 |
| 6,886,670 B2 * | 5/2005 | Holiviers et al. | ....... | 188/322.15 |
| 6,968,930 B2 * | 11/2005 | Shibao | .................. | 188/322.17 |
| 7,011,193 B2 * | 3/2006 | Lemmens et al. | ...... | 188/322.17 |

FOREIGN PATENT DOCUMENTS

DE 1 968 391 9/1967

* cited by examiner

*Primary Examiner*—Thomas E Lazo
(74) *Attorney, Agent, or Firm*—Cohen Pontani Lieberman & Pavane LLP

(57) ABSTRACT

A piston-cylinder assembly includes a working cylinder, and a one-piece stamped and formed piston body which is attached to a piston rod, the piston body being axially movable in the cylinder and dividing the cylinder into two working spaces. The piston body has at least one first opening provided with a first valve for passing fluid when the piston moves in a pull direction, and at least one second opening provided with a second valve for passing fluid when the piston moves in a push direction. A circumferential surface of the piston body is formed with a shallow groove which holds a seal between the circumferential surface and the working cylinder.

15 Claims, 4 Drawing Sheets

PISTON FOR A PISTON-CYLINDER UNIT

BACKGROUND OF THE INVENTION

1. Field of the Invention

The invention pertains to a piston for a piston-cylinder unit, including an axially movable piston body, which is attached to a piston and which divides a working cylinder into two working spaces; openings for the push and pull direction, which are provided with valves and which generate a damping force; and a seal on the circumferential surface of the piston to seal the piston off against the working cylinder.

2. Description of the Related Art

Pistons for hydraulic devices are already known (e.g., DE 1968391 GM), which are provided with a passage in the piston and an element acting as a valve, where the spring-loaded intermediate element is designed to serve in the one flow direction as a valve for the seat in the piston and in the other flow direction as a seat for the valve disks.

SUMMARY OF THE INVENTION

An object of the present invention is to create a piston for a piston-cylinder unit with a piston valve of simple design, which consists of only a few easy-to-assemble parts and which nevertheless fulfills the required damping function. In addition, the piston valve is intended to be made of low-cost materials and manufactured at low cost.

According to the invention, that the piston body is designed as a one-piece stamped and formed sheet metal part.

The advantage here is that the piston body can be manufactured easily by stamping and forming and is then ready to install, the least possible amount of mechanical finishing work being required.

A low-cost, simple seal between the outside surface of the piston body and the inside wall of the working cylinder can be provided by forming a shallow groove in the circumferential surface of the piston, and using a sheet metal piston ring as a seal.

According to another essential feature, a valve disk cooperates with at least one opening during the pull stage, and the valve disk seals off at least one opening during the push stage.

It is advantageous for the valve disk to be actuated by a spring.

It is also advantageous for the spring to be supported on the inside circumference of the piston body, preferably on an inward directed flange formed by peeing.

An embodiment which is favorable from the standpoint of fabrication technology and also from that of cost optimization is characterized in that at least one opening assigned to the push stage is covered by an elastic element. It is advantageous here for the openings to be located on a cylindrical section of the piston body and to be sealed off by an elastic, ring-shaped part.

According to another advantageous embodiment, a tubular elastomeric element, in particular a section of hose, is provided as the elastic, ring-shaped part.

According to another embodiment, the valve disk has at least one bore for the push stage, which is closed by a corresponding number of valve bodies. According to another embodiment, the valve bodies are spring-loaded.

It also favorable from the standpoint of fabrication technology for the openings in the piston body to be produced with raised edges. In terms of tool technology, it is favorable for the raised edges to be produced by means of a stamping tool proceeding from the opposite end surface.

According to another embodiment, the spring is held in place with respect to the piston body by a positive connection. It is advantageous here for the spring to be supported by an area of the piston body which is peened over during assembly to form a circumferential flange. During the assembly process itself, it is possible for the peening to be adjusted appropriately on the basis of a desired force-versus-distance relationship. The use of different springs, furthermore, can be used to realize settings for any desired variant.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
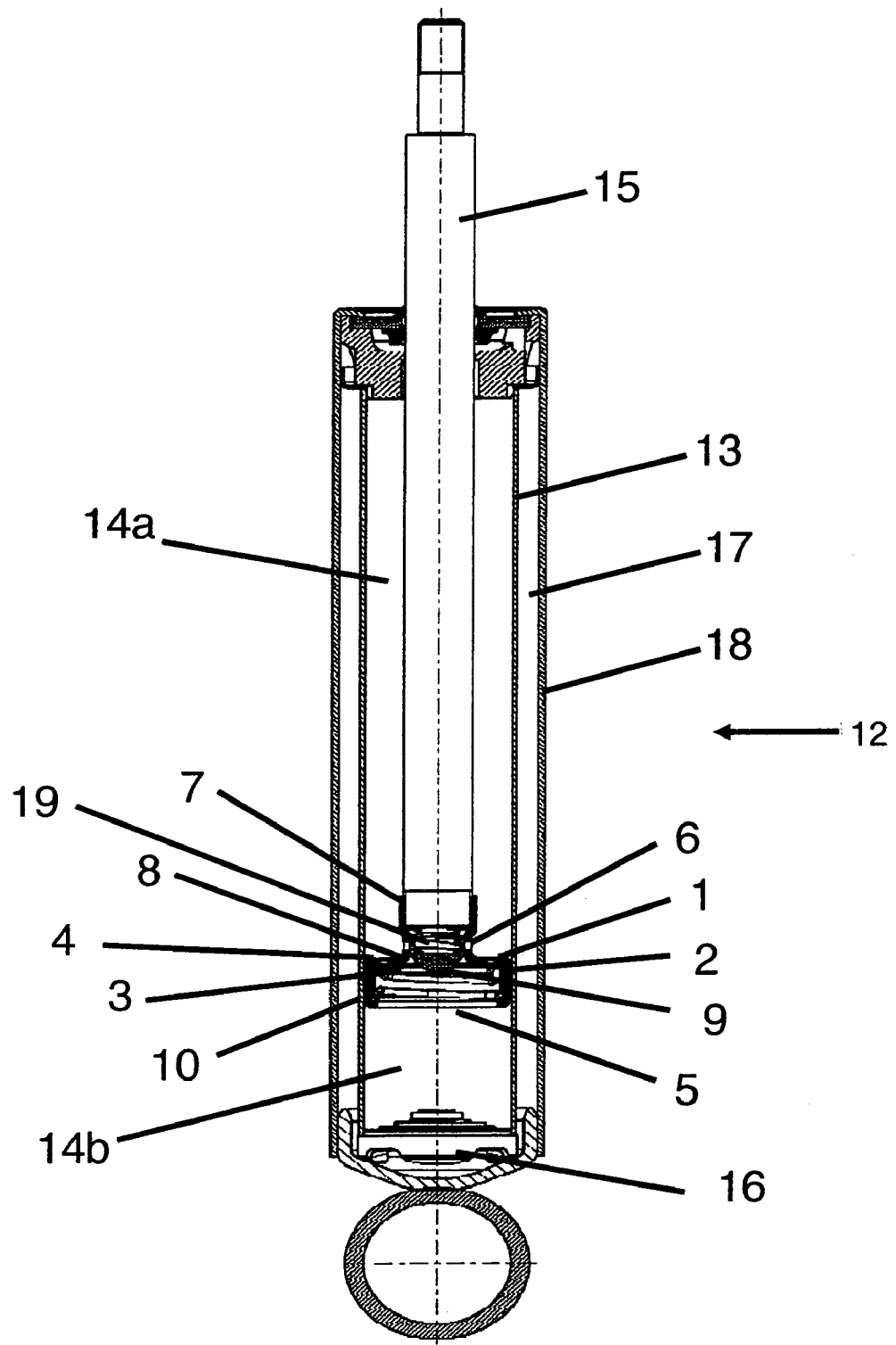
FIG. 1 shows an overall view of a piston-cylinder unit, partially in cross section.

The piston-cylinder unit 12 shown in FIG. 1 consists essentially of the piston body 1 and the working cylinder 13, which is divided by the piston body 1 into two working spaces 14a, 14b. The piston body 1 is attached to the piston rod 15 and is free to move axially back and forth along with the piston rod 15 in the working cylinder 13. The working cylinder 13 also has a bottom valve 16, through which the damping medium can reach the compensating space 17.

The piston body 1 could also be easily installed, however, in a so-called single-tube vibration damper, which has only a gas-filled compensating space inside the working cylinder 13.

In the case of the two-tube vibration damper shown in FIG. 1, the compensating space 17 is formed coaxially between the working cylinder 13 and the outside tube 18.

The piston body 1 is provided on its outer circumference with a seal 2 to seal it off against the inside wall of the working cylinder 13; in this exemplary embodiment, the seal is in the form of a sheet-like piston ring. The valve disk 3, which is located in the piston body 1, is supported against the piston body by a spring 5, so that, in the pull direction, the openings 4 in the piston body 1 allow the damping medium to pass from the upper working space 14a to the lower working space 14b after the valve disk 3 has been lifted.

In the push direction, i.e., as the piston rod 15 travels inward, the pressure in the lower working space 14b pushes the valve disk 3 against the piston body 1, so that the damping medium can flow only through the central bore 8 in the valve disk 3 to the openings 4a and past the elastic element 6.

Figure 2:
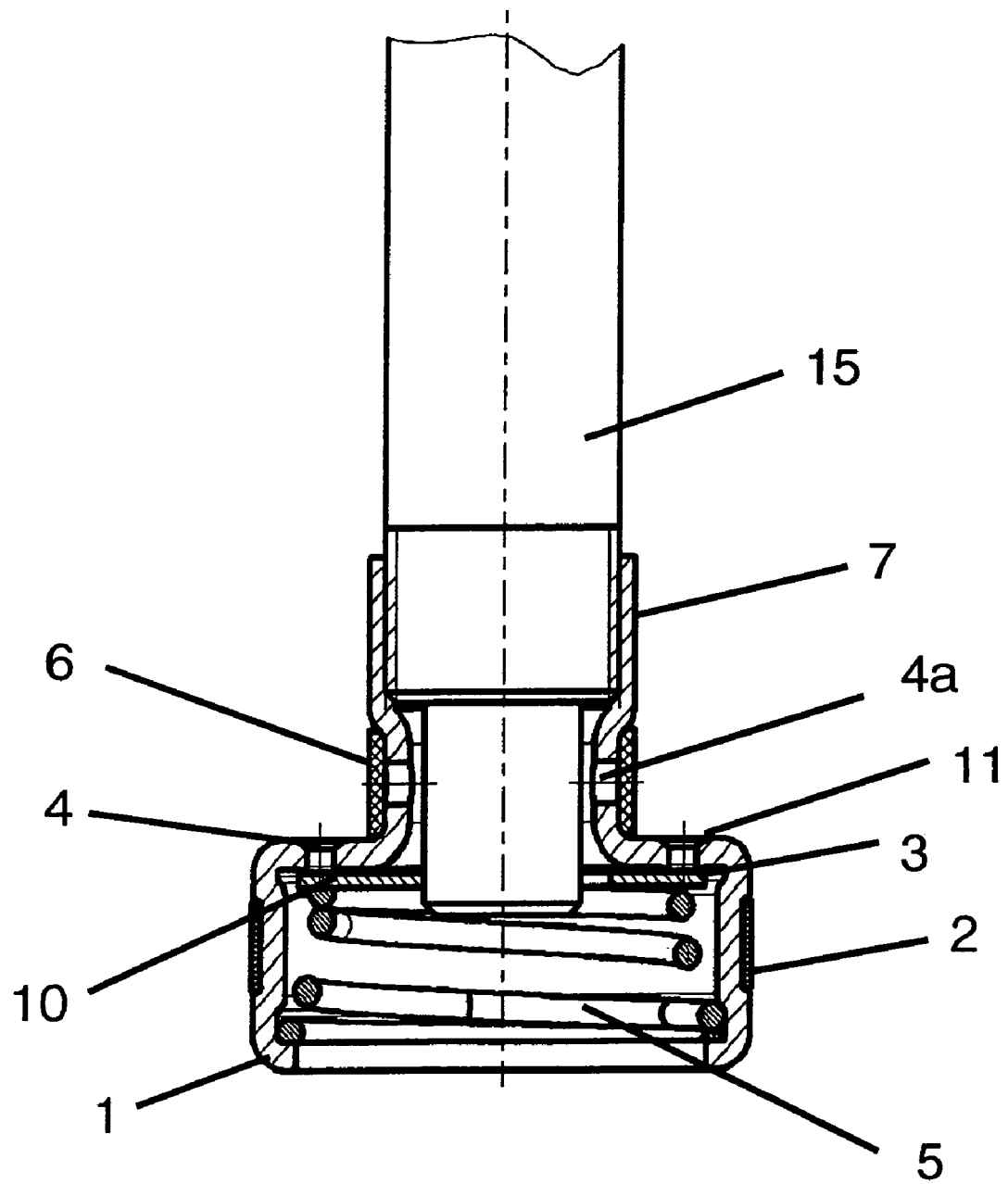
FIG. 2 shows a piston for a piston-cylinder unit according to FIG. 1 as an isolated part, in cross section.

FIG. 2 shows a piston body 1 as an isolated part, which is attached in the area of the cylindrical section 7 to the piston rod 15 by means of, for example, a connection which requires no machining. The cylindrical section 7 also has the openings 4a, which are closed off by an elastic element in the form of a tubular elastomeric element 6. The element 6 serves in the pull direction to seal off the openings 4a, whereas, in the push direction, it allows oil to pass through, past the element 6.

The piston body 1 is manufactured as a one piece stamped and formed sheet metal part, where not only the openings 4 but also the raised edges 10, which surround the openings 4, are produced by means of a stamping tool. The raised edges 10 make it possible for the valve disk 3 to form a satisfactory seal and can extend all the way around the circumference and thus also result additionally in a certain pre-throttling effect.

Figure 3:
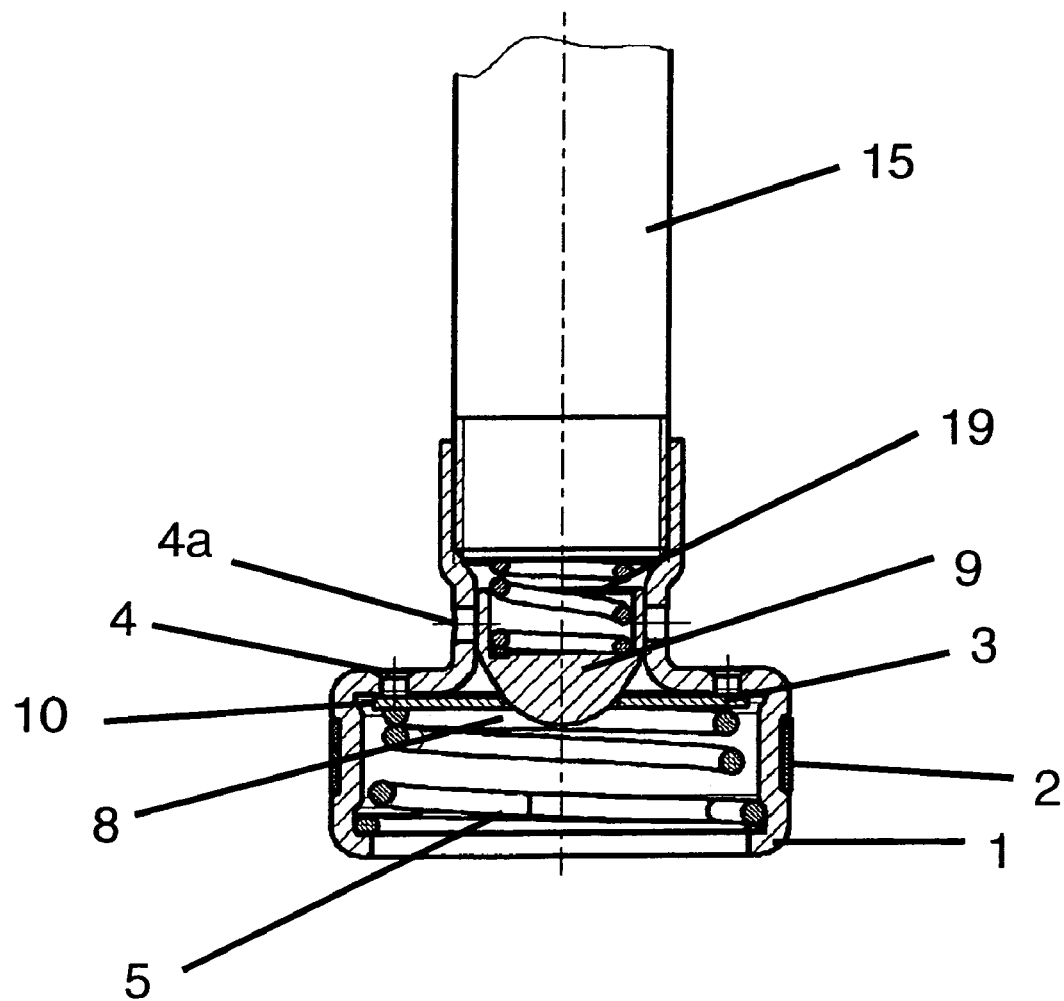
FIGS. 3 and 4 show cross sections through additional variants of a piston and an associated push-stage valve.

FIG. 3 shows an embodiment in which the bore 8 in the valve disk 3 is closed off by a valve body 9. The valve body 9 is supported by a spring element 19 against the piston rod 15 and serves in the push direction as a damping valve, so that the central bore 8 and the opening 4a are opened.

In the pull direction, the valve body 9 closes both the openings 4a and the bore 8, so that only the valve disk 3, supported by the spring 5, is active with respect to the damping effect of the damping medium. The openings 4 are provided with elevations 10, as previously mentioned, to improve the sealing effect. The piston ring 2, which is held in place by a shallow groove formed in the piston body 1, serves as a seal against the inside wall of the working cylinder 13.

Figure 4:
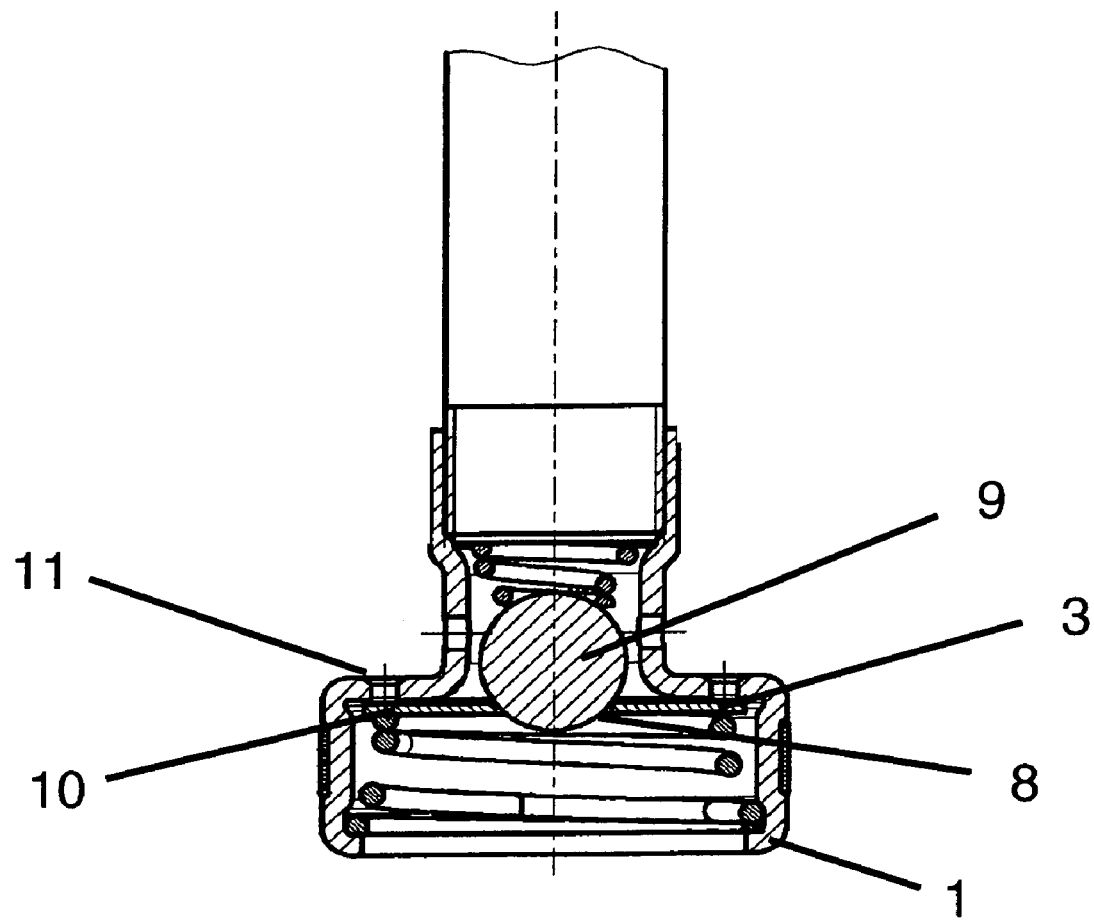

FIG. 4 again shows a piston body 1, in which the bore 8 in the valve disk 3 is sealed off by a valve body 9 in the form of a ball. Otherwise, this design is the same in principle as already described on the basis of FIG. 3. The elevations 10 can also be produced in this embodiment by a stamping tool, proceeding from the opposite end surface 11 of the piston body 1.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A piston-cylinder assembly comprising:
a working cylinder;
a one-piece stamped and formed piston body which is attached to a piston rod, the piston body being axially movable in the cylinder and dividing the cylinder into two working spaces;
at least one first opening in the piston body, the first opening being provided with a first valve for passing fluid when the piston moves in a pull direction, the first valve comprises:
a disk that releases said at least one first opening when said piston rod moves out of said cylinder, and closes said at least one first opening when said piston rod moves into said cylinder; and
a spring which loads said disk against said first opening,
at least one second opening in the piston body, the second opening being provided with a second valve for passing fluid when the piston moves in a push direction; and
a seal between a circumferential surface of the piston body and the working cylinder, said piston body formed with a circumferential flange which supports said spring.

2. The piston-cylinder assembly of claim 1 wherein the circumferential surface is formed with a ring groove, the seal comprising a sheet-like piston ring seated in said groove.

3. The piston-cylinder assembly of claim 1 wherein said second valve comprises an elastomeric element over said at least one second opening.

4. The piston-cylinder assembly of claim 1 wherein said at least one first opening has raised edges facing said disk.

5. The piston-cylinder assembly of claim 4 wherein said raised edges are produced during stamping.

6. A piston-cylinder assembly comprising:
a working cylinder;
a one-piece stamped and formed piston body which is attached to a piston rod, the piston body being axially movable in the cylinder and dividing the cylinder into two working spaces;
at least one first opening in the piston body, the first opening being provided with a first valve for passing fluid when the piston moves in a pull direction;
at least one second opening in the piston body, the second opening being provided with a second valve for passing fluid when the piston moves in a push direction, said second valve comprises an elastomeric element over said at least one second opening; and
a seal between a circumferential surface of the piston body and the working cylinder,
wherein said piston body is formed with a cylindrical section in which said at least one second opening is formed, said elastomeric element comprising a tubular elastomeric element.

7. The piston-cylinder assembly of claim 6 wherein said tubular elastomeric element is a section of hose.

8. A piston-cylinder assembly comprising:
a working cylinder;
a one-piece stamped and formed piston body which is attached to a piston rod, the piston body being axially movable in the cylinder and dividing the cylinder into two working spaces;
at least one first opening in the piston body, the first opening being provided with a first valve for passing fluid when the piston moves in a pull direction, the first valve comprises a disk that releases said at least one first opening when said piston rod moves out of said cylinder, and closes said at least one first opening when said piston rod moves into said cylinder;
at least one second opening in the piston body, the second opening being provided with a second valve for passing fluid when the piston moves in a push direction; and
a seal between a circumferential surface of the piston body and the working cylinder,
wherein said disk has an aperture which opens when the piston moves in the push direction, the aperture being closed by a valve body.

9. The piston-cylinder assembly of claim 8 further comprising a spring which loads said valve body against said aperture.

10. A piston for a piston-cylinder assembly, the piston comprising:
a one-piece stamped and formed piston body having at least one first opening provided with a first valve for passing fluid when the piston moves in a pull direction, and at least one second opening provided with a second valve for passing fluid when the piston moves in a push direction, the first valve comprises:

a disk which releases said at least one first opening when said piston moves in the pull direction, and closes said at least one first opening when said piston moves in a push direction; and a spring which loads said disk against said first opening; and a seal between a circumferential surface of the piston body and the working cylinder, the piston body formed with a circumferential flange which supports said spring.

11. The piston of claim 10 wherein the circumferential surface is formed with a ring groove, the seal comprising a sheet-like piston ring seated in said groove.

12. The piston of claim 10 wherein said at least one first opening has raised edges facing said disk, wherein said raised edges are produced during stamping.

13. A piston for a piston-cylinder assembly, the piston comprising:

a one-piece stamped and formed piston body having at least one first opening provided with a first valve for passing fluid when the piston moves in a pull direction, and at least one second opening provided with a second valve for passing fluid when the piston moves in a push direction; and a seal between a circumferential surface of the piston body and the working cylinder, wherein the piston body is formed with a cylindrical section in which said at least one second opening is formed, said piston further comprising a tubular elastomeric element over said at least one second opening.

14. A piston for a piston-cylinder assembly, the piston comprising:

a one-piece stamped and formed piston body having at least one first opening provided with a first valve for passing fluid when the piston moves in a pull direction, and at least one second opening provided with a second valve for passing fluid when the piston moves in a push direction, the first valve comprises:

a disk which releases said at least one first opening when said piston moves in the pull direction, and closes said at least one first opening when said piston moves in a push direction; and a spring which loads said disk against said first opening, a seal between a circumferential surface of the piston body and the working cylinder, wherein said disk has an aperture which opens when the piston moves in the push direction, the aperture being closed by a valve body.

15. The piston of claim 14 further comprising a spring which loads said valve body against said aperture.

* * * * *